United States Patent [19]

Nakayama

[11] Patent Number: 4,860,307

[45] Date of Patent: Aug. 22, 1989

[54] SYNCHRONIZATION PULSE GENERATOR IN SPREAD SPECTRUM COMMUNICATION SYSTEM

[75] Inventor: Shigeyuki Nakayama, Koganei, Japan

[73] Assignee: Kabushiki Kaisha Kenwood, Tokyo, Japan

[21] Appl. No.: 106,420

[22] Filed: Oct. 9, 1987

[30] Foreign Application Priority Data

Oct. 14, 1986 [JP] Japan .................. 61-242026

[51] Int. Cl.$^4$ .................. H04K 1/00; H04L 9/00
[52] U.S. Cl. .................................................. 375/1
[58] Field of Search .......................... 375/1; 380/34

[56] References Cited

U.S. PATENT DOCUMENTS

| | | | |
|---|---|---|---|
| 3,916,313 | 10/1975 | Lowry | 375/1 |
| 4,037,159 | 7/1977 | Martin | 375/1 |
| 4,122,393 | 10/1978 | Gordy et al. | 375/1 |
| 4,285,060 | 8/1981 | Cobb et al. | 375/1 |
| 4,301,537 | 11/1981 | Roos | 375/1 |
| 4,385,401 | 5/1983 | Jagnow et al. | 375/1 |
| 4,435,821 | 3/1984 | Ito et al. | 375/1 |
| 4,468,784 | 8/1984 | Jagnow et al. | 375/1 |

Primary Examiner—Salvatore Cangialosi
Attorney, Agent, or Firm—Gerald J. Ferguson, Jr.

[57] ABSTRACT

A synchronization pulse generator in a spectrum spread communication system includes first and second envelope detectors for subjecting a correlation output of a spectrum spread signal to envelope detection; a threshold value generator for generating a threshold value having a level corresponding to an output from the second envelope detector; and a comparator for comparing an output level of the first envelope detector with a threshold value generated by the threshold value generator, and outputting an initial synchronization pulse.

3 Claims, 5 Drawing Sheets

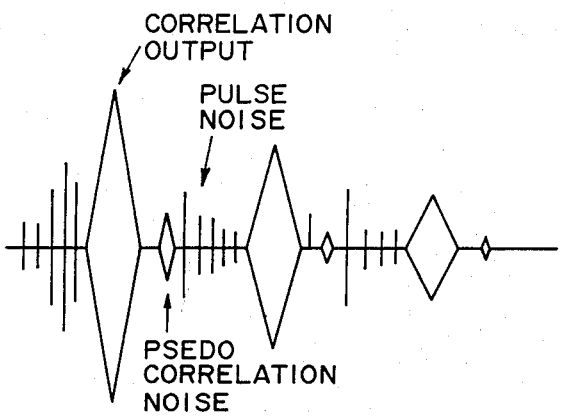
FIG. 2A
CORRELATION
OUTPUT
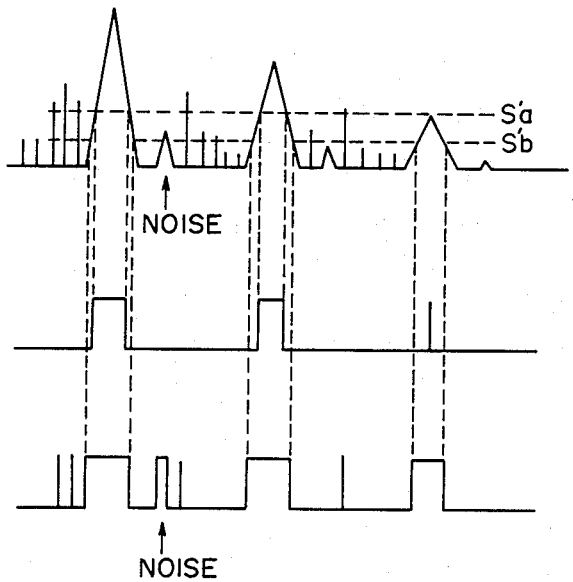
FIG. 2B
ENVELOPE
DETECTION
OUTPUT
FIG. 2C
INITIAL SYNC.
PULSE
(THRESHOLD S'a)
FIG. 2D
INITIAL SYNC.
PULSE
(THRESHOLD S'b)
PRIOR ART

CORRELATION SIGNAL

ENVELOPE DETECTION OUTPUT

THRESHOLD WAVEFORM

INITIAL SYNC. PULSE

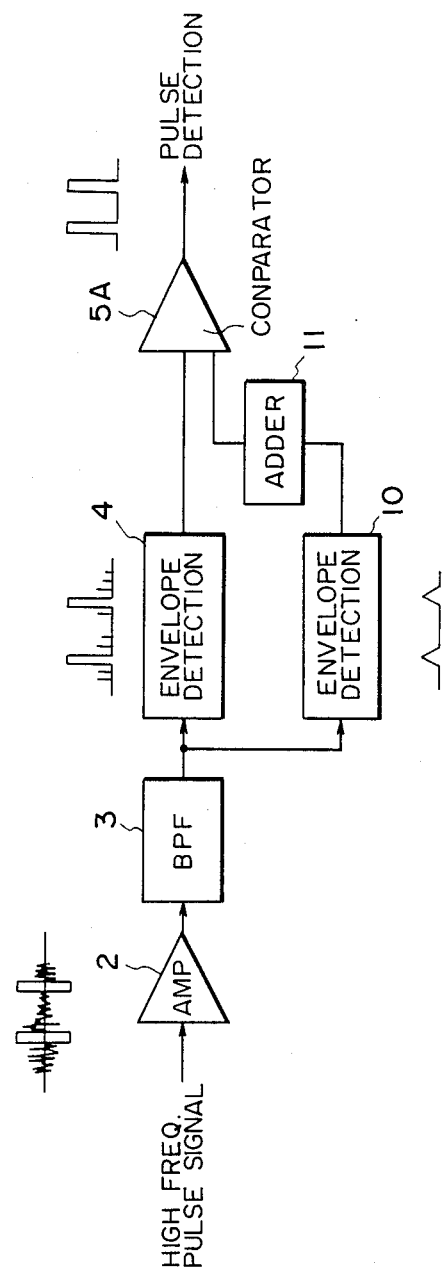
F I G. 5

SYNCHRONIZATION PULSE GENERATOR IN SPREAD SPECTRUM COMMUNICATION SYSTEM

BACKGROUND OF THE INVENTION

Field of the Invention

The present invention relates to a synchronization pulse generator in a spread spectrum communication system, particularly to a synchronization pulse generator which generates a synchronization pulse for initial synchronization by using a surface acoustic wave convolver (hereinafter called SAW convolver) or the like.

Different from the narrow band communication which is conventionally widely used, the spread spectrum communication is the system for spreading the energy of information signals to a very wide frequency band. Therefore, this communication has various advantageous features which cannot be obtained in the conventional communication and can be applied to various wide fields such as space communication, ground communication (in particular, mobile transceiver), distance measurement, instrumentation, and the like.

The spread spectrum system includes the following systems.

(1) DS (Direct Sequence) system
(2) FH (Frequency Hopping) system
(3) TH (Time Hopping) system
(4) Pulse coding FM system
(5) Hybrid system In general, at present, the DS and FH systems are used, the TH system and pulse coding FM system are applied to the limited fields, and the hybrid system is being theoretically studied. The principle of the DS system will now be described. On the transmission side, the information signal is subjected to an ordinary modulation (primary modulation). The primary-modulated signal is then modulated by the spread pseudo noise code (spread PN code) of a wide band and transmitted as a wide band signal having a very small power density. This operation is called a spread modulation. On the reception side, the correlation with the received or incoming signal is derived by use of the same demodulating PN code as that on the transmission side. After the correlation was obtained, only the signal to be received is converted into the original primary-modulated signal of the narrow band. The other signals and interference signal become the wide band noises having a small power density. Only a desired signal is extracted by a filter. The primary modulation can use the analog system such as FM and the digital system such as PSK. In general, the PSK system by the pseudo noise (PN) code is used as the spread modulation. The ratio of the band width between the primary-modulated signal and the signal after it was spread is called a process gain. As the process gain is large, the advantages of the spread spectrum system are obtained. In general, the process gain is set to 100 to 10000.

It is required that the demodulating PN code which is generated on the reception side has the same bit constitution and the same phase as those of the PN code in the incoming or received spread spectrum signal. Therefore, the initial synchronization (synchronization trapping) is performed to make the phase of the PN code on the reception side coincide with the phase of the PN code in the incoming signal. Next, in order to keep the phase-coincident PN code on the reception side, the synchronization holding process is performed by a delay-locked loop circuit (DLL).

In a conventional synchronization pulse generator using a SAW convolver as shown in FIG. 1, an input signal PN code and a reference PN code are supplied to input terminals of the SAW convolver to conduct convolution integration and detect a correlation, the reference PN code having a same PN pattern as that of the input signal within the range of a gate length of the SAW convolver and having an opposite time axis to that of the input signal PN code. The detected correlation is amplified by a correlation amplifier 2. An output from the correlation amplifier 2 is passed through a band-pass filter 3 to remove unnecessary frequency components and thereafter, it is subjected to envelope detection at an envelope detector 4. A detected envelope output is compared with a reference value at a comparator 5 to obtain a shaped waveform. The reference value is given as an output from a threshold setting rheostat 7. An output pulse from the comparator 5 is supplied to a synchronization holding circuit 9 as an initial synchronization pulse for use in controlling the circuit.

FIG. 2A shows a detected correlation output waveform from the SAW convolver 1, and FIG. 2B shows an output waveform from the envelope detector 4. The level of a detected correlation output varies with the level of an input signal by which a correlation was obtained. Thus, the level of an output noise becomes in proportion to that of the detected correlation output. When a level of the threshold setting rheostat 7 is set at Sa' as shown in FIG. 2B, an initial synchronization pulse has a waveform as shown in FIG. 2C, whereas when the level is set at Sb', an initial synchronization pulse has a waveform as shown in FIG. 2D. These initial synchronization pulses are used by the synchronization holding circuit 9 as a control pulse.

With the above-described conventional synchronization pulse generator, however, since the threshold value set by the threshold setting rheostat is fixed, the pulse width of an initial synchronization pulse varies as shown in FIGS. 2C and 2D as an input signal level of the SAW convolver changes. Further, the comparator 5 may generate a false initial synchronization pulse due to superposition of noises or the like so that the false pulse makes the synchronization holding circuit unstable.

SUMMARY OF THE INVENTION

The present invention seeks to solve the above problems and provide a synchronization pulse generator capable of correctly outputting a correlation signal even if an input signal level changes or noises are superposed.

To eliminate the above problems, the synchronization pulse generator of this invention comprises first and second envelope detectors for subjecting a correlation output of a spectrum spread signal to envelope detection; threshold value generator means for generating a threshold value having a level corresponding to an output from the second envelope detector; and a comparator for comparing an output level of the first envelope detector with a threshold value generated by the threshold value generator means, and outputting an initial synchronization pulse.

According to the present invention, a first detection output is obtained by detecting a correlation output of a spectrum spread signal by the first envelope detector, and a second detection output is obtained by detecting the same correlation output by the second envelope detector. The level of the first detection output is compared by the comparator with a threshold value obtained by threshold value generator means and having a level corresponding to the second detection output. The output from the comparator is supplied as an initial synchronization pulse to the synchronization holding circuit.

The threshold value generated by threshold value generator means corresponds to the second detection output, and hence the level of the spectrum spread input signal. Accordingly, even if the level of a correlation output varies with that of the spectrum spread input signal, or noises are superposed, the threshold value is caused to change correspondingly so that the width of an initial synchronization pulse is maintained constant.

DESCRIPTION OF THE DRAWINGS

FIG. 2D to FIG. 2D show output waveforms in the conventional detector of FIG. 1.

FIG. 5 is a circuit diagram of a pulse signal detection circuit in data communication which adopts the present invention.

DETAILED DESCRIPTION OF THE PREFERRED EMBODIMENTS

Figure 1:
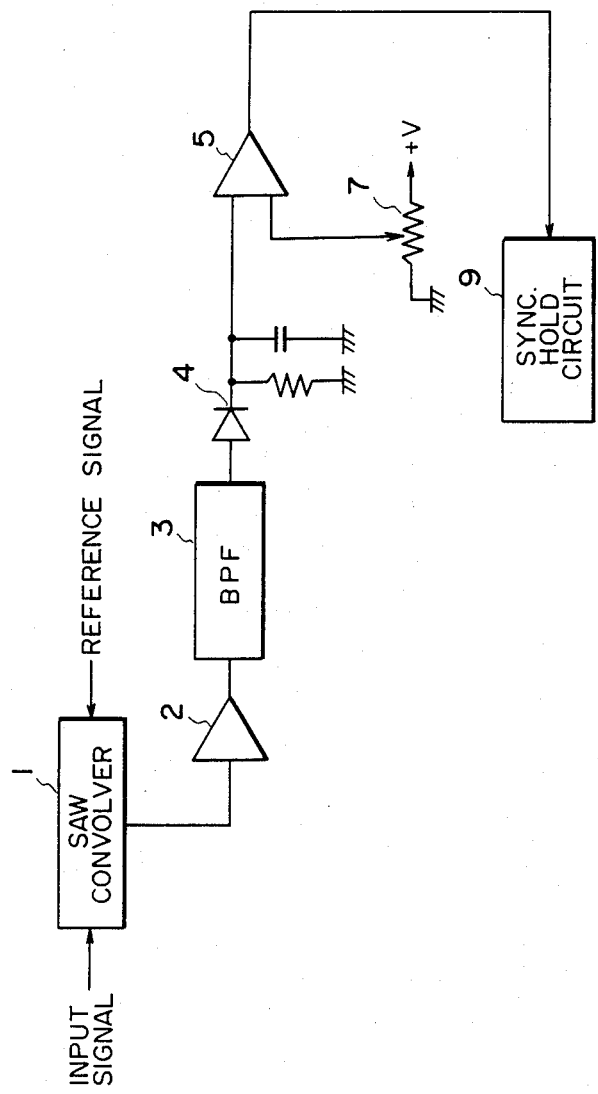
FIG. 1 is a circuit diagram of a conventional synchronization pulse detector.
Figure 3:
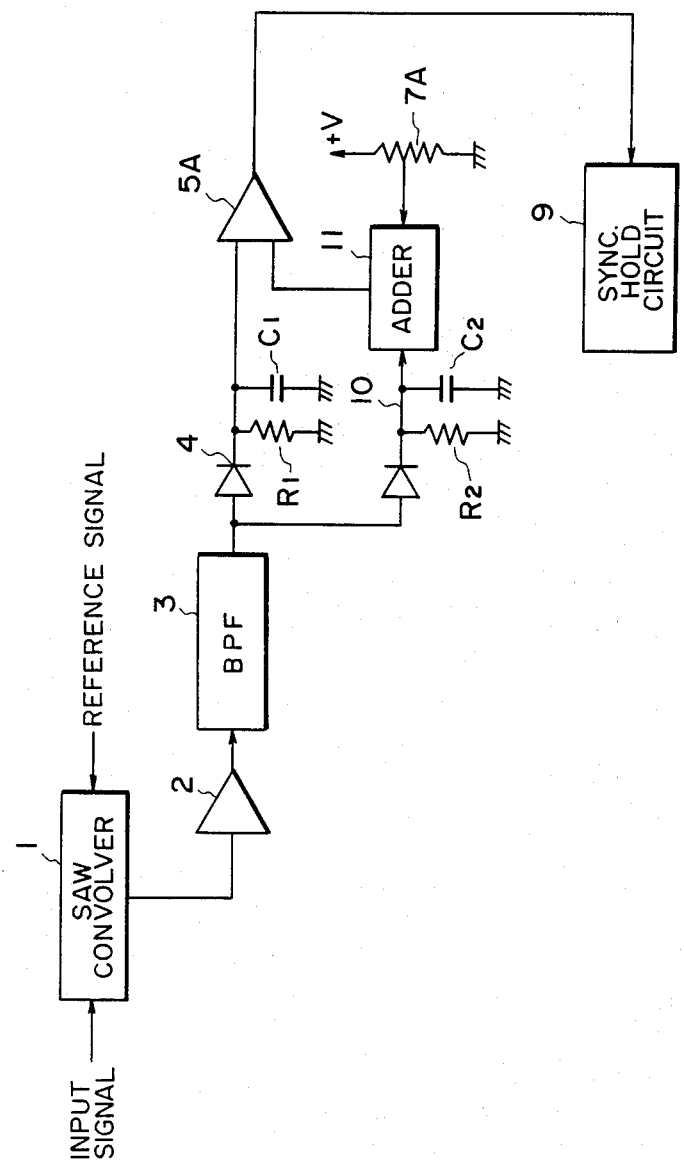
FIG. 3 is a circuit diagram of an embodiment of synchronization pulse detector according to the present invention.

An embodiment of the present invention is illustrated in FIG. 3. An input signal PN code and a reference signal PN code are subjected to convolution integration by a SAW convolver 1 to thereby detect and output a correlation. In this case, as described before, the reference signal PN code has an opposite time axis to that of the input signal PN code. When the patterns of the two PN codes become coincident with each other, a correlation is obtained at that time which corresponds to an initial synchronization point.

A detected correlation output from the SAW convolver 1 is amplified by a correlation amplifier 2 and passed to a band-pass filter 3 to remove unnecessary frequency band components. An output of the band-pass filter 3 is supplied to an envelope detector 4 to be subjected to envelope detection, the output from the envelope detector being supplied to a comparator $5_A$.

The output of the band-pass filter 3 is also supplied to an envelope detector 10 with high frequency components attenuated more than those for the envelope detector 4, to be subjected to envelope detection. The output from the envelope detector 10 is added to an output from a voltage rheostat $7_A$ by an adder 11. Accordingly, the output from the adder 11 has a value of the envelope detector output biased by the amount of a setting value by the voltage rheostat $7_A$. The output of the adder 11 is supplied as a threshold value to the comparator $5_A$ to compare it with the output level of the envelope detector 4. A shaped waveform from the comparator $5_A$ is supplied as an initial synchronization pulse to a synchronization holding circuit 9. The operation of an embodiment of the synchronization pulse generator constructed as above will be described with reference to FIGS. 4A to 4D.

Figure 4A:
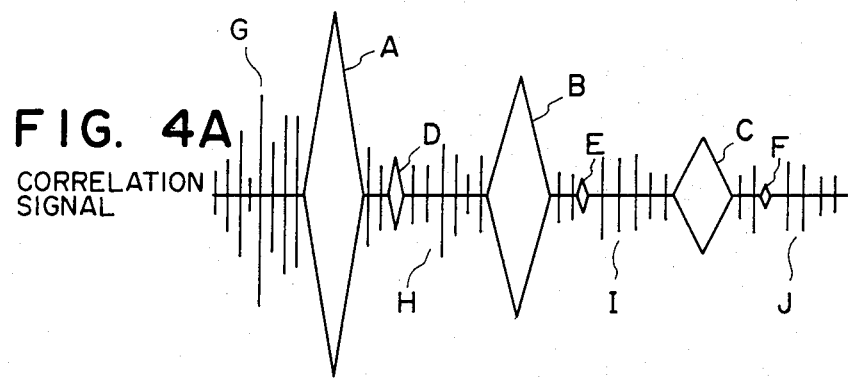
FIG. 4A to FIG. 4D show output waveforms in the detector of FIG. 3 according to the present invention.
Figure 4B:
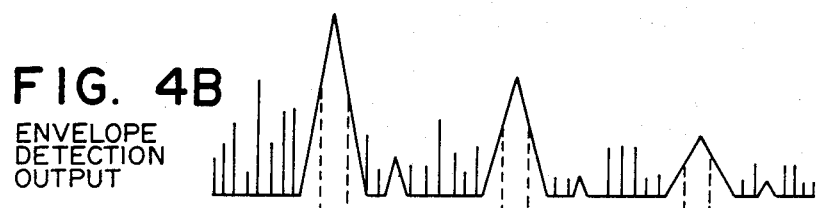

The level of a detected correlation output from the SAW convolver shown in FIG. 3 varies with that of the spectrum spread input signal. For example, a detected correlation output is designated by "A", "B" and "C", a pseudo-correlation noise is designated by "D", "E" and "F" and a random noise is designated by "G, H, I and J", respectively in FIG. 4A. FIG. 2A is used again as FIG. 4A. In this example, the level of a detected correlation output is shown as lowering as time elapses. The output of the SAW convolver 1 is amplified, removed therefrom unnecessary frequency band components, and subjected to envelope detection by the envelope detector 4. In this case, the value of resistor R1 and capacitor C1 of the envelope detector 4 is selected to obtain a high detection efficiency. The detection output is shown in FIG. 4B.

Figure 4C:
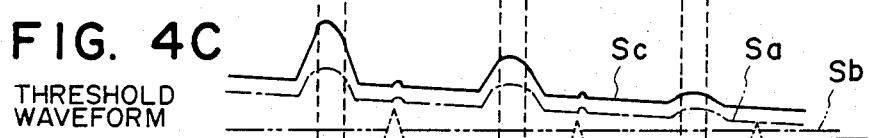

The detected correlation output from the band-pass filter 3 is also subjected to envelope detection by the envelope detector 10. The value of resister R2 and capacitor C2 of the envelope detector 10 is so selected that noise components in the output of the SAW convolver 1 and the band-pass filter 3 can be converted into DC components and that envelope detection of the detected correlation output can be performed. The values of resister R2 and capacitor C2 should be selected so that the cut-off frequency of the C2R2 filter can remove the pulse noise which includes high frequency components and also the envelope detection output of the correlation output does not become DC components only. For example, the value ob R2×C2 are set to be 1000 to 10000 times the value ob R1×C1. Thus, the output of the envelope detector 10 has a waveform Sa shown in FIG. 4C. The output voltage of the voltage rheostat $7_A$ is set at a DC level Sb as shown in FIG. 4C. As a result, the threshold value supplied to the comparator $5_A$ has a level obtained by adding the output from the envelope detector 10 to the output from the voltage rheostat $7_A$ by the adder, and has a waveform Sc which corresponds to the waveform Sa biased by the DC level Sb. Thus, the threshold changes approximately in proportion to the level of the detected correlation output.

Figure 4D:
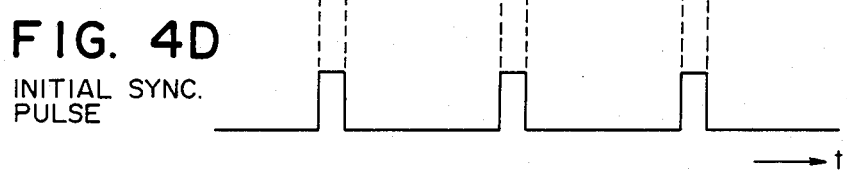

The threshold value Sc and the output level of the envelope detector 4 are compared at the comparator $5_A$ whose output becomes as shown in FIG. 4D. Thus, although the level of the spectrum spread input signal changes, the output pulse width from the comparator $5_A$ is maintained constant, to thereby enable to obtain a stable initial synchronization pulse.

In case where there is not a detected correlation output but a noise output, a DC level output corresponding to the noise output is produced from the envelope detector 10. The DC level output added to the DC level Sb set by the voltage rheostat is supplied as a threshold value to the comparator $5_A$. Since the threshold value is higher than the detection output from the envelope detector 4, the comparator $5_A$ never outputs an initial synchronization pulse which might be caused by the noise output. In FIG. 4C, a broken line represents an output waveform from the envelope detector 4 when a noise is introduced.

Further, even if a sharp change in the level of the detected correlation output occurs, the output waveform of the envelope detector 10 can follow it enough so that the comparator $5_A$ never outputs a false initial synchronization pulse.

Changing a threshold value of the comparator $5_A$ in accordance with an input signal may be applied to a pulse signal detector in data communication. The block diagram and waveforms in such a case are shown in FIG. 5, the operation thereof being similar to that of the above embodiment.

As seen from the foregoing description of the present invention, even if an input signal level of the SAW convolver and hence a detected correlation output level changes, or noise components are included in the SAW convolver output, the threshold value of the comparator can be changed in pursuant to the detected correlation output level and noise components so that a false initial synchronization pulse can be prevented from being outputted from the comparator.

Further, it is possible to avoid an unstable operation of the comparator to be caused by a change in gain of the correlation amplifier, or a malfunction of the comparator to be caused by a sharp change in input signal level.

I claim:

1. A synchronization pulse generator in a spectrum spread communication system comprising:

first and second envelope detectors for subjecting a correlation output of a spectrum spread signal to envelope detection, a time constant in the second envelope detector being larger than a time constant of the first envelope detector;

threshold value generator means for generating a threshold value having a level corresponding to an output from the second envelope detector; and a comparator for comparing an output level of the first envelope detector with a threshold value generated by the threshold value generator means, and outputting an initial synchronization pulse.

2. A synchronization pulse generator in a spectrum spread communication system according to claim 1, wherein said threshold value generator means comprises a rheostat for generating a DC output, and an adder for adding a DC output from said rheostat to an output from said second envelope detector.

3. A synchronization pulse generator in a spectrum spread communication system according to claim 1, the time constant of said second envelope detector is 1000 to 10000 times that of said first envelope detector.

* * * * *